United States Patent [19]

Ikeda et al.

[11] 3,721,656

[45] March 20, 1973

[54] METHOD OF PRODUCING STABLE POLYURETHANE SOLUTIONS

[75] Inventors: Yuichi Ikeda, Yokohama; Choji Yuyama, Kosakai; Tsuguhisa Hirukawa, Kosakai; Yoshio Isshiki, Kosakai, all of Japan

[73] Assignee: Ameliotex, Inc., New York, N.Y.

[22] Filed: Sept. 3, 1971

[21] Appl. No.: 177,632

[52] U.S. Cl. ................................260/77.5 AA, 260/30.6 R, 260/30.8 DS, 260/32.6 N, 260/77.5 AM

[51] Int. Cl. .................................C08g 22/04

[58] Field of Search..260/77.5 AM, 30.8 DS, 32.6 N, 260/30.6 R, 77.5 AA

[56] References Cited

UNITED STATES PATENTS

| | | | |
|---|---|---|---|
| 3,378,511 | 4/1968 | Newton | 260/77.5 AP |
| 3,475,266 | 10/1969 | Strassel | 260/77.5 AM |

*Primary Examiner*—Donald E. Czaja
*Assistant Examiner*—M. J. Welsh
*Attorney*—James E. Ryder et al.

[57] ABSTRACT

A method for improving the solution stability and homogeneity of substantially linear polyurethanes obtained by the reaction in solution of a diamine chain extending agent with an isocyanate-terminated prepolymer.

4 Claims, 1 Drawing Figure

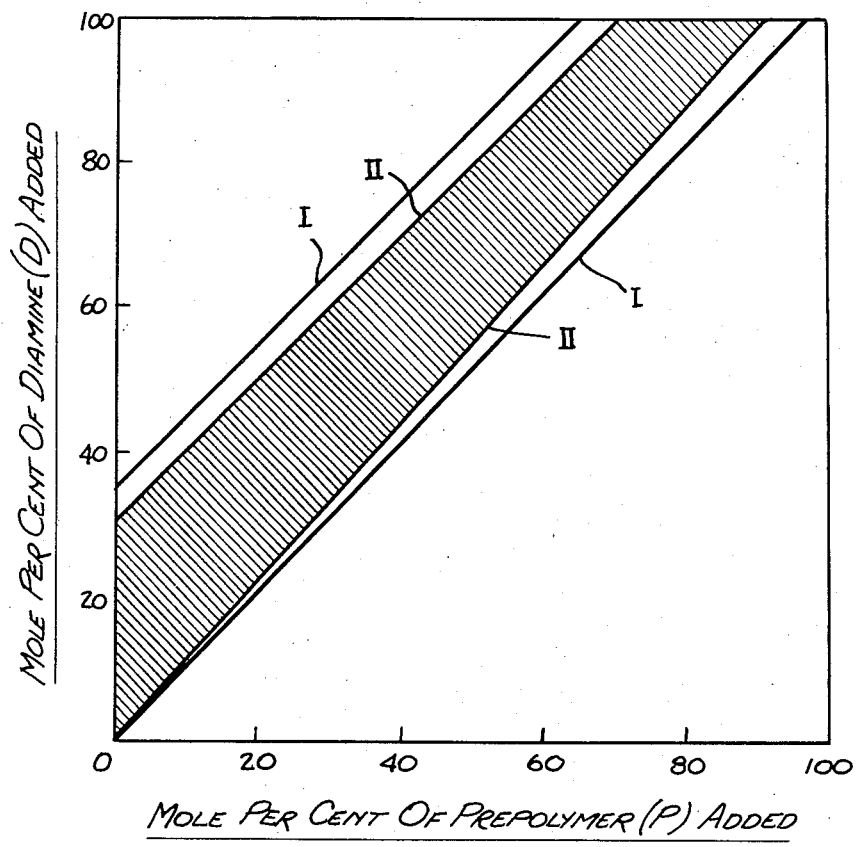

METHOD OF PRODUCING STABLE POLYURETHANE SOLUTIONS

BACKGROUND

The usual process for producing a polyurethane solution is to first react a hydroxyl-terminated substantially linear polyester, polyether, polyacetal, polyester-ether, or the like with an excess amount of organic diisocyanate to form an isocyanate-terminated prepolymer which is then chain-extended in the presence of a solvent with diamines or other compounds containing two active hydrogens.

It is well-known that the reactions of an isocyanate group with active hydrogen compounds are exothermic and difficult to control and maintain uniformly in batch systems, particularly with fast-reacting systems such as the conventional symmetric aromatic isocyanate-terminated urethane prepolymers in combination with aliphatic, diprimary amine chain extenders. The result is that gel structures and other inhomogeneities are formed almost invariably during the solution chain-extension step, leading to rapidly increasing viscosity and eventually complete gelation with the passage of time and to attendant difficulties in maintaining shaped article production and property uniformity.

Various methods have been proposed for reducing gel formation, such as decreasing the chain-extension reaction rate by chain-extending at low temperatures, chain extending in two steps using two chain extenders of differing reactivity, using stabilizers such as acetone during chain extension, or using a continuous chain-extension process in which only small amounts of reactants are combined at any one time. Although these and other prior art methods have been successful to varying extents, it has still been difficult without basic and extensive modifications in formulations and equipment, using conventional prepolymers and chain extenders, to produce a polyurethane solution industrially which is stable enough to be stored for more than a few days.

SUMMARY OF THE INVENTION

This invention is a method performed in batch for producing exceptionally stable and homogeneous substantially linear urethane polymer solutions suitable for production of films, coatings, filaments and other shaped articles. It also produces urethane polymers with more uniform and more narrow molecular weight distributions than those produced by conventional methods.

The method is carried out by the reaction in batch in a polar solvent of conventional prepolymers and diamine chain extenders at specified rates of addition of the reactants to the reaction zone within limits expressed by the following sets of equations in which Set II expresses a preferred range:

Set I: $D \leq P + 35\%$ $$D \geq \frac{100}{95} P$$

or, preferably

Set II: $D \leq P + 30\%$ $$D \geq \frac{100}{90} P$$

in which P and D represent, respectively, the amount of prepolymer and diamine extender which have been added at any time, during the period extending from the beginning to the completion of diamine addition, expressed as a mole percent of the total amount of each, respectively, to be added for completion of the reaction. As thus expressed, 65 to 95 percent, preferably 70 to 90 percent, of the stoichiometrically required prepolymer solution should have been added to the reaction zone after all of the diamine chain extender has been added.

In calculating the amount of prepolymer required at any given time during the reaction, all compounds containing active hydrogen atoms which would react with isocyanate groups must be taken into account, whether monofunctional, bifunctional or polyfunctional, the degree of functionality determining the corresponding amount of prepolymer required. Thus 1 mole of a monoamine chain terminator would be included as a half-mole of a bifunctional chain extender for purposes of calculating the amount of required prepolymer according to the above equations.

DRAWING

The FIGURE shows in graph form the equations set forth above.

DETAILED EMBODIMENTS AND EXAMPLES

In carrying out the method of this invention, both solvent and a definite but small (hereinafter defined) amount of diamine chain extender may be placed in the reaction zone initially, followed by simultaneous addition of both prepolymer and chain extender at a rate falling within the limits established by the Set I equations above. The initial amount of diamine and rates of addition of the reactants should be such that all of the diamine chain extender will have been added when 65 to 95 percent, preferably 70 to 90 percent, of the stoichiometrically required prepolymer amount has been added. Once this point has been reached, the remainder of the prepolymer may be added at any reasonable rate which will allow reaching the desired solution viscosity and still maintain a slight excess of amine groups in the finished polymer. Alternatively, one may start with solvent alone in the reaction zone and add the chain extender at a greater speed than and simultaneously with the urethane prepolymer, the rates of addition again conforming to the boundary conditions established by the Set I equations above. As above, all of the chain extender in this alternative case will have been added when 65 to 95 percent, preferably 70 to 90 percent, of the stoichiometrically required prepolymer amount has been added. Again, the remainder of prepolymer needed to reach the desired viscosity end point may then be added at any reasonable rate as in conventional processes.

The above sets of equations are shown in graph form in the FIGURE, in which the limits of the Set I of equations are shown as "I" on the graph and the preferred limits of the equations of Set II as "II." The equations (as more fully shown in the FIGURE) show that an excess amount of diamine chain extender should always exist in the reaction system. In this connection, the ratio of chain extender to prepolymer should be as high as possible in order to better control and keep the final polymer chain length from getting too high. It is desirable, therefore, to add 3 to 30 percent of the total amount of diamine extender to be used to the solvent in the reactor before adding the prepolymer simultaneously with the remainder of the diamine. A more narrow molecular weight distribution is obtained in this way. In line with this the chain terminator may be added towards the end of the chain-extension reaction, but it is preferable to mix it with the diamine chain extender and use it from the beginning of the reaction; this method also aids in obtaining a more narrow molecular weight distribution of the polymer in solution.

The uniqueness of this invention is the initial concentration of diamine chain extender used and the subsequent rates of addition of both chain extender and prepolymer with the limits set forth in the Set I equations. By use of the method of this invention, usually homogeneous and stable urethane polymer solutions are obtained. If one works outside those limits of rates of addition of diamine chain extender and prepolymer, the resulting solutions obtained are stable for only a few days, less homogeneous in physical properties and more difficult to control in viscosity and solid content from batch to batch.

The bifunctional urethane prepolymer having an isocyanate group at both ends of the molecule to be used in this invention can be produced by reacting at least one kind of glycol, polyether glycol, polyester glycol, polyester-ether glycol, or polyacetal glycol, having a molecular weight in the range of approximately 300 to 8,000, preferably 800 to 3,000 with at least one kind or organic diisocyanate in an excess amount, preferably 150 to 200 mol percent of the amount of glycol used.

Such polyether glycols should preferably have melting points below 60° C and second order transition points below normal room temperature. Examples are polyoxyethylene glycol, polyoxypropylene glycol, polyoxypropylene-ethylene glycol, polyoxytetramethylene glycol, polyoxypentamethylene glycol, polyoxyhexamethylene glycol, etc. Such polyester glycols should preferably be those obtained by polycondensation of an aliphatic dicarboxylic acid or aromatic dicarboxylic acid with an aliphatic glycol or a polyester blycol, such as polycaprolactone, obtained by ring-opening polymerization of a lactone. Useful aliphatic dicarboxylic acids include succinic acid, adipic acid, pimelic acid, suberic acid and sebacic acid, and useful aromatic dicarboxylic acids include terephthalic acid and hexahydroterephthalic acid. Such useful aliphatic glycols include ethylene glycol, propylene glycol, butylene glycol, hexamethylene glycol, decamethylene glycol and neopentyl glycol.

Organic diisocyanates suitable for producing the urethane prepolymer for use in this invention include 1,6-hexamethylenediisocyanate, cyclohexylenediisocyanate, paraphenylenediisocyanate, naphthylene-1,5-diisocyanate, toluylene diisocyanates, diphenylmethane 4,4'-diisocyanate, azobenzene-4,4'-diisocyanate, 1-isopropylbenzene-3,5-diisocyanate, dicyclohexylmethylene-4,4'-diisocyanate, etc., among which diphenylmethane-4,4'-diisocyanate is especially suitable. Organic diisothiocyanates corresponding to the above may also be used.

The polar solvents useful in the method of this invention include dimethylformamide, dimethylacetamide, dimethylsulfoxide and hexamethylphosphoramide.

Useful diamine chain extenders include hydrazines, ethylene diamine, propylenediamine, hexamethylenediamine, cyclohexylenediamine, methyliminobispropylamine, piperazine, 2-methylpiperazine, naphthylenediamine, diaminodiphenylmethane, phenylenediamine, toluylenediamine, xylenediamine, 3,3'-dichloro-4,4'-diaminodiphenylmethane, carbodihydrazide, carboxylic-acid-hydrazide, and mixtures of them.

The chain terminator useful in the method of this invention is a compound containing only one primary or secondary amino group, such as dimethylamine, diethylamine, dibutylamine, diethanolamine and N,N-dimethyl-1,3-propanediamine.

The chain extension reaction may be carried out at room temperature, but a temperature around 10° C in the earlier stage of reaction, where the solution viscosity is low, is preferable, and a temperature around 30° C is desirable during the latter stages of polymerization, when the chain-extending reaction is completed.

Polyurethane solutions obtained by this invention have less tendency to rise in viscosity with time, or to gel, are more transparent, have better spinnability, and show less tendency to phase separation between the solvent and the polymer.

Furthermore, by applying the method of this invention, the abnormal climbing of solution up the agitator shaft that we often see in the course of chain-extension by other methods is seldom witnessed. It is also an advantage of this method that the amount of chain terminator needed in this method is smaller than in the other hitherto known methods. Moreover, we can produce, by this method, stable urethane solutions of higher concentrations and viscosities.

Polyurethane solutions obtained by the method of this invention have a molecular weight distribution in a narrow range, and are homogeneous.

Polyurethane solutions obtained by this invention can be made into shaped elastomers by the usual methods. For instance, polyurethane elastic filaments made from these solutions by the usual dry-spinning methods are as good in mechanical properties as those formed from solutions conventionally made. Furthermore, spinning of these solutions 30 days after their preparation produced filaments no different from ones spun immediately after the solution was made. In contrast, conventionally made solutions all gelled within a week. Solutions produced by this invention also have the advantage of prolonging the filter and spinnerette life as well as minimizing yarn breaks occurring immediately after extrusion from the nozzle, in contrast to solutions made according to previously known methods.

In the following examples the methods of Nos. 1–3, 7, 8 and 12–14 are within the limits of Set I of the equations and the remaining examples are outside of those limits.

All amounts indicated by parts or percent are based on weight unless otherwise specified.

EXAMPLE 1

A. Prepolymer:

601.8 parts of a hydroxyl-terminated 2,030 molecular weight copolyester glycol comprising the reaction product of a 9 to 1 molar mixture of ethylene-and propylene-glycol with adipic acid was mixed with 148.2 parts of diphenylmethane-4,4'-diisocyanate at 60° C. The temperature was raised to 90° C in 30 minutes and the mixture was reacted under a dry nitrogen blanket at 90° C for 60 minutes with constant agitation to form an isocyanate-terminated urethane prepolymer. The prepolymer was then diluted with 250 parts of dimethylformamide (DMF) to reduce its viscosity and to facilitate subsequent mixing and transfer operations. The isocyanate content of the solution was 2.365 percent.

B. Chain Extension:

1. An amine solution for chain extension use was prepared by mixing together 3.50 grams of methylimino-bis-propylamine, 11.59 grams of ethylene diamine and 0.46 grams of diethanolamine (chain terminator) and diluting the mixture with DMF to a total volume of 100cc.

2. The chain extension was carried out under a nitrogen blanket at a temperature of 10° to 30° C starting with a mixture of 2,106 grams of DMF and 5cc of the above amine solution. To this mixture there was added simultaneously with vigorous stirring 2.0cc/min. of the amino solution prepared in Part "B.1." and 15.6 grams/min. of the diluted isocyanate-terminated urethane prepolymer from Part "A" above. The addition of chain extenders and prepolymer was continued for a period of 47.5 minutes after which time all of the chain extenders from Part "B.1." and 95 percent of the stoichiometrically required amount of prepolymer solution had been added. At this point, the prepolymer solution addition rate was decreased to 7.8 grams/min. and continued until 97.5 percent of the stoichiometrically required amount of prepolymer had been added, then further decreased to 3.9 grams/min. and continued until 99.5 percent of the stoichimetrically required amount of prepolymer had been added. The reaction was stopped at this point yielding a polyurethane solution with a viscosity at 30° C of 400 poises, a solids content of 20.1 percent and a polymer inherent viscosity of 1.25 at 30° C in DMF. Additional properties are shown in the accompanying Table I.

C. Filament Formation:

A portion of the urethane polymer solution from "B.2." was filtered and immediately wet-spun into a 20 percent solution of DMF in water through a spinnerette having 60 holes, each hole 0.11mm in diameter, to produce a coalesced filament bundle having a denier of approximately 420 after subsequent hot water extraction and hot roll drying. Other portions of the urethane polymer solution were wet-spun similarly after 5 days and 10 days storage, respectively. Solution properties as well as filament properties are shown in Table I.

EXAMPLE 2

Example 1 was repeated except that chain extension was carried out starting with a mixture of 2,106 grams of DMF and 20 cc of the initial 100 cc of amine solution. Prepolymer solution was added to this mixture with vigorous stirring at a rate of 15.6 grams/min. whereas the remainder of the amine solution was added 10cc at a time at intervals of 5 minutes. When the last 10 cc addition of amine solution was made and reacted, 80 percent of the stoichiometrically required prepolymer solution has been added. Additional prepolymer solution was added at a rate of 7.8 grams/ min. until 95 percent stoichiometry was achieved, and then at a rate of 3.9 grams/min. until 98.9 percent stoichimetry was reached. At this point a colorless, transparent polyurethane solution of 390 poise viscosity at 30° C and 20.0 percent solids content was obtained. The solution was spun into filaments as in Part "C" of Example 1 above. Additional data are summarized in Table I.

EXAMPLE 3

Example 1 was repeated except that chain extension was carried out starting with a mixture of 2,106 grams of DMF and 25 cc of amine solution. Prepolymer solution and amine solution were then added simultaneously with vigorous stirring at a rate of 15.6 grams/min. and 2.0cc/min., respectively, for 37.5 minutes. At this point, all of the amine solution and 75 percent of the stoichiometrically required prepolymer solution had been added. The remainder of the prepolymer solution was then added to 99.3 percent stoichiometry as in Examples 1 and 2. The resulting urethane polymer solution had a 30° C viscosity of 380 poises, a solids content of 20.1 percent, and a polymer inherent viscosity of 1.20 in DMF at 30° C. Additional data are summarized in Table 1.

EXAMPLE 4

Example 1 was repeated except that chain extension was carried out as in convention methods in 2,106 grams of DMF with the simultaneous addition of amine solution and prepolymer solution at a rate of 2.0cc/min. and 15.6 grams/min., respectively, for a period of 50 minutes. At this point all of the amine solution and 97.5 percent of the stoichiometrically required prepolymer solution had been added. Further prepolymer solution was then added at a rate of 3.9 grams/min. until 97.8 percent stoichiometry was reached at which point shaft climbing occurred. The resulting solution had a percent solids of 19.8, and was non-homogeneous, ranging in viscosity from 100 to 420 poises from one point to another. Although the solution could be spun immediately after its preparation, it gelled within 2 days and could not be spun further. The data are summarized in Table 1.

EXAMPLE 5

Example 1 was repeated except that chain extension was carried out in 2,106 grams of DMF containing 70cc of amine solution with the simultaneous addition of 2.0cc/min. of amine solution and 15.6 grams/min. of prepolymer solution for 15 minutes. At this point all of the amine solution had been added but only 30 percent of the required amount of prepolymer. Further addition of prepolymer solution was made to 98.4 percent of stoichiometry, at which point shaft climbing began. The resulting solution had a solids content of 19.9 percent and a 30° C viscosity of 350 poises. Gelation occurred within 10 days. The data are summarized in Table 1.

EXAMPLE 6

Example 1 was repeated except that all of the amine solution (100cc) was mixed with 2,106 grams of DMF and then the prepolymer solution was added at a rate of 15.6 grams/min. to 95 percent stoichiometry and finally at a rate of 7.8 grams/min. to 97.5 percent stoichiometry at which point shaft climbing occurred. The resulting polyurethane solution had a 30° C viscocity of 150 poises, a solids content of 19.8 percent and gelled within 5 days. Further data are summarized in Table 1.

EXAMPLE 7

A. Prepolymer:

278.6 parts of hydroxyl-terminated 1536 molecular weight copolyester glycol comprising the reaction product of a 7 to 3 molar mixture of 1,6-hexanediol and 2,2,-dimethyl-1,3-propanediol with adipic acid, and 278.6 parts of a 1,324 molecular weight polyoxytetramethylene glycol were mixed at 50° C with 184.7 parts of diphenylmethane-4,4'-diisocyanate and 8.2 parts of 80/20 tolylene diisocyanate. The temperature was raised to 80° C in 30 minutes and the mixture was reacted under a dry nitrogen blanket at 80° for 60 minutes with constant agitation to form an isocyanate-terminated urethane prepolymer. The prepolymer was then diluted with 250 parts of DMF, to yield a solution with an isocyanate content of 3.136 percent.

B. Chain Extension:

1. An amine solution for chain extension use was prepared by mixing together 4.0 grams of 2-methylpiperazine, 14.4 grams of ethylene diamine and 0.722 grams of dibutylamine (chain terminator) and diluting the mixture with dimethylacetamide (DMA) to a total volume of 100cc.

2. The chain extension was carried out under a nitrogen blanket starting with a mixture of 2,062 grams of dimethylacetamide and 10cc of the above amine solution at 10° C. To this mixture there was added simultaneously with vigorous stirring 2.0cc/min. of the amine solution prepared in part "B.1." and 15.1 grams/min. of the diluted isocyanate-terminated urethane prepolymer from Part "A" above. The addition of chain extenders and prepolymer was continued for a period of 45 minutes after which time all of the amine solution from Part "B.1." and 90 percent of the stoichiometrically required amount of prepolymer solution had been added. Further addition of prepolymer solution was continued at the rate of 15.1 grams/min. until 95 percent of the stoichiometrically required amount of prepolymer had been added. At this point the prepolymer solution addition rate was decreased to 7.6 grams/min. and continued until 97.5 percent of the stoichiometrically required amount of prepolymer had been added, then further decreased to 3.9 grams/min. and continued until 99.7 percent of the stoichiometrically required amount of prepolymer had been added. The colorless, transparent polyurethane solution thus obtained had a solids content of 20.1 percent, a 30° C viscosity of 420 poises and a polymer inherent viscosity of 1.27 measured in DMF at 30° C. The solution was spun into filaments as in Part C of Example 1 was excellent results. Additional properties are shown in Table 2.

EXAMPLE 8

Example 7 was repeated except that chain extension was carried out starting with a mixture of 2,062 grams of dimethylacetamide (DMA) and 30cc of amine solution to which both amine and prepolymer solutions were added simultaneously at the same rates as in Example 7 for a period of 35 minutes. At this point all of the amine solutions and 70 percent of the stoichiometrically required prepolymer solution had been added. Further prepolymer solution was added as in Example 7 until 99.1 percent stoichiometry was achieved. A colorless, transparent polyurethane solution of 410 poises at 30° C and 20.0 percent solids content was obtained. The solution was spun into filaments as in Part C of Example 1. Solution and filament data are summarized in Table 2.

EXAMPLE 9

Example 7 was repeated except that chain extension was carried out in 2,062 grams of DMA with the simultaneous addition of amine and prepolymer solutions at the same rates as in Example 7 for a period of 50 minutes. At this point, all of the amine solution and 97.5 percent of the stoichiometrically required prepolymer solution had been added. Further prepolymer solution was then added at a rate of 3.9 grams/min. until 99.7 percent stoichiometry was reached at which point shaft-climbing occurred. The resulting solution had a percent solids content of 19.7 percent and was homogeneous, ranging in viscosity from 100 to 525 poises from one point to another. Although the solution could be spun immediately after its preparation, it gelled within 2 days and could not be spun further. The data are summarized in Table 2.

EXAMPLE 10

Example 7 was repeated except that chain extension was carried out starting with a mixture of 2,062 grams of DMA and 50cc of amine solution to which both amine and prepolymer solutions were added simultaneously at the same rates as in Example 7 for a period of 25 minutes. At this point all of the amine solution and 50 percent of the stoichiometrically required prepolymer solution had been added as in Example 7 until 98.6 percent stoichiometry was reached at which point excessive shaft-climbing occurred. The resulting solution had a solids content of 19.9 percent and a viscosity of 380 poises at 30° C, and gelled within 10 days of its preparation. The data are summarized in Table 2.

EXAMPLE 11

Example 7 was repeated except that the 2.062 grams of DMA was first mixed with all of the amine solution (100cc) and then prepolymer solution was added at a rate of 15.1 grams/min. until 95.6 percent stoichiometry was reached when shaft-climbing occurred. The resulting polymer solution had a solids content of 19.5 percent and gelled within 5 days of its preparation. The data are summarized in Table 2.

EXAMPLE 12

A. Prepolymer:

527.4 parts of a 1,516 molecular weight polyoxytetramethylene glycol was mixed at 50° C with 168.7 parts of diphenylmethane-4,4'-diisocyanate and 3.9 parts of P-xylylene diisocyanate. The temperature was raised to 65° C for 60 minutes with constant agitation to form an isocyanate-terminated urethane prepolymer. The prepolymer was then diluted with 300 parts of DMA to yield a solution with an isocyanate content of 2.774 percent.

B. Chain Extension:

1. An amine solution for chain extension use was prepared by mixing together 20.0 grams of 1,2-propylene diamine and 0.697 grams of dibutylamine and diluting the mixture with DMA to a total volume of 100cc.

2. Chain extension was carried out under a nitrogen blanket starting with a mixture of 1,667 grams of DMF and 15cc of the above amine solution at 10° C. To this mixture there was added simultaneously with vigorous stirring 1.79cc/min. of the amine solution prepared in Part "B.1." and 16.5 grams/min. of the diluted isocyanate-terminated urethane prepolymer from Part A above. The addition of chain extender and prepolymer solutions was continued for a period of 47.5 minutes after which time all of the amine solution and 95 percent of the stoichiometrically required amount of prepolymer solution had been added. Further addition of prepolymer solution was continued at a rate of 8.3 grams/min. until 97.5 percent stoichiometry was reached, and then continued at a rate of 4.2 grams/min. until 99.6 percent stoichiometry was achieved. At this point a colorless, transparent polyurethane solution was obtained with a solids content of 22.9 percent and a viscosity of 750 poises at 30° C. The data in Table 3 indicate the excellent stability of this solution and the properties of yarns obtained by dry-spinning.

EXAMPLE 13

Example 12 was repeated except that during chain extension the rate of addition of the amine solution was increased to 2.13cc/min. The addition of amine solution was completed in 40 minutes at which point the prepolymer was at 80 percent of stoichiometry. Further prepolymer was added as in Example 12 until 99.2 percent of stoichiometry had been reached, yielding a polyurethane solution with a solids content of 22.9 percent and a viscosity at 30° C of 725 poises. The data in Table 3 indicate the excellent solution stability and dry-spun yarn properties obtainable.

EXAMPLE 14

Example 12 was repeated except that during chain extension the rate of addition of the amine solution was further increased to 2.62cc/min. so that the addition of amine solution was completed in 32.5 minutes at which point the prepolymer was at 65 percent of stoichiometry. Further prepolymer was added as in Example 12 until 99.1 percent of stoichiometry had been reached yielding a colorless, transparent polyurethane solution with a solids content of 22.9 percent and a viscosity of 720 poises. The data in Table 3 indicate the excellent solution stability and dry-spun yarn properties obtainable.

EXAMPLE 15

Example 12 was repeated except that chain extension was carried out in 1,667 grams of DMA containing 40cc of amine solution with the simultaneous addition of 2.0cc/min. of amine solution and 16.5 grams/min. of prepolymer solution for 30 minutes. At this point all of the amine solution had been added and 60 percent of the required amount of prepolymer. Further prepolymer was added at the same rates as in Example 12 to 98.8 percent of stoichiometry. The colorless, transparent polyurethane solution obtained had a solids content of 22.8 percent and a viscosity of 710 poises, but gelled within 10 days of its preparation and became unspinnable. The solution and yarn data are summarized in Table 3.

EXAMPLE 16

Example 12 was repeated except that all of the amine solution (100cc) was mixed with 1,667 grams of DMA and then the prepolymer solution was added at the same rates used in Example 12 until 98.0 percent of stoichiometry was reached when excessive shaft climbing occurred. The polyurethane solution obtained had a solids content of 22.7 percent and an initial viscosity of 690 poises but gelled within 5 days and became unspinnable. The solution and yarn data are summarized in Table 3.

TABLE 1

| Time of test after solution preparation | Example 1 | Example 2 | Example 3 | Example 4 | Example 5 | Example 6 |
|---|---|---|---|---|---|---|
| Immediately after | 400 | 390 | 380 | 100 to 420 | 350 | 150 |
| 2 days after | 450 | 400 | 390 | (1) | 420 | 700 |
| 5 days after | 420 | 420 | 420 | | 850 | (1) |
| 10 days after, and | 446 | 450 | 470 | | (1) | |
| 20 days after making | 460 | 480 | 510 | | | |
| Yarn proportion: | | | | | | |
| Spun immediately after solution preparation: | | | | | | |
| Denier (d.) | 427 | 425 | 425 | 415 | 420 | 412 |
| Tenacity (g./d.) | 1.137 | 1.110 | 1.109 | 0.621 | 1.083 | 0.803 |
| Elongation (percent) | 602 | 600 | 612 | 483 | 595 | 517 |
| 300% modulus (g./d.) | 0.153 | 0.150 | 0.149 | 0.108 | 0.155 | 0.127 |
| Spun 5 days after solution preparation: | | | | | | |
| Denier (d.) | 424 | 423 | 421 | (2) | 418 | (2) |
| Tenacity (g./d.) | 1.140 | 1.121 | 1.122 | | 0.817 | |
| Elongation (percent) | 611 | 610 | 614 | | 563 | |
| 3% Modulus (g./d.) | 0.155 | 0.151 | 0.153 | | 0.138 | |
| Spun 10 days after solution preparation: | | | | | | |
| Denier (d.) | 420 | 421 | 418 | | (2) | |
| Tenacity (g./d.) | 1.132 | 1.115 | 1.127 | | | |
| Elongation (percent) | 600 | 602 | 619 | | | |
| 300% modulus (g./d.) | 0.157 | 0.154 | 0.154 | | | |

[1] Gelled.
[2] Unspinnable.

TABLE 2

| Time of test after solution preparation | Example 7 | Example 8 | Example 9 | Example 10 | Example 11 |
|---|---|---|---|---|---|
| Viscosity of polymer solution (poise): | | | | | |
| Immediately after preparation | 420 | 410 | 100 to 525 | 380 | 75 |
| 2 days after preparation | 430 | 425 | (1) | 475 | 850 |
| 5 days after preparation | 442 | 450 | | 925 | (3) |
| 10 days after preparation | 450 | 480 | | (3) | |
| 20 days after preparation | 475 | 525 | | | |
| Yarn proportion: | | | | | |
| Spun immediately after solution preparation: | | | | | |
| Denier (d.) | 430 | 426 | 417 | 421 | 410 |
| Tenacity (g./d.) | 1.217 | 1.201 | 0.685 | 1.118 | 0.574 |
| Elongation (percent) | 585 | 578 | 492 | 555 | 520 |
| 300% modulus (g./d.) | 0.226 | 0.230 | 0.136 | 0.221 | 0.121 |
| Spun 5 days after solution preparation: | | | | | |
| Denier (d.) | 432 | 427 | (2) | 424 | (2) |
| Tenacity (g./d.) | 1.223 | 1.214 | | 0.847 | |
| Elongation (percent) | 590 | 580 | | 560 | |
| 300% modulus (g./d.) | 0.224 | 0.231 | | 0.189 | |
| Spun 10 days after solution preparation: | | | | | |
| Denier (d.) | 424 | 422 | | (2) | |
| Tenacity (g./d.) | 1.225 | 1.197 | | | |
| Elongation (percent) | 591 | 575 | | | |
| 300% modulus (g./d.) | 0.223 | 0.226 | | | |

1 Turned white and gelled.
2 Unspinnable.
3 Gelled.

TABLE 3

| Time of test after solution preparation | Example 12 | Example 13 | Example 14 | Example 15 | Example 16 |
|---|---|---|---|---|---|
| Viscosity of polymer solution (poise): | | | | | |
| Immediately after preparation | 750 | 725 | 720 | 710 | 690 |
| 2 days after preparation | 760 | 725 | 750 | 1,150 | 1,700 |
| 5 days after preparation | 780 | 735 | 760 | 1,600 | (1) |
| 10 days after preparation | 790 | 755 | 780 | (1) | |
| 20 days after preparation | 820 | 780 | 840 | | |
| Yarn proportion: | | | | | |
| Spun immediately after solution preparation: | | | | | |
| Denier (d.) | 423 | 422 | 422 | 420 | 415 |
| Tenacity (g./d.) | 1.378 | 1.381 | 1.366 | 1.121 | 1.074 |
| Elongation (percent) | 550 | 547 | 545 | 537 | 518 |
| 300% modulus (g./d.) | 0.259 | 0.266 | 2.268 | 0.233 | 0.223 |
| Spun 5 days after solution preparation: | | | | | |
| Denier (d.) | 420 | 419 | 417 | 418 | (2) |
| Tenacity (g./d.) | 1.382 | 1.374 | 1.370 | 1.773 | |
| Elongation (percent) | 560 | 549 | 553 | 510 | |
| 300% modulus (g./d.) | 0.265 | 0.258 | 0.276 | 0.185 | |
| Spun 10 days after solution preparation: | | | | | |
| Denier (d.) | 418 | 416 | 417 | (2) | |
| Tenacity (g./d.) | 1.380 | 1.375 | 1.369 | | |
| Elongation (percent) | 550 | 551 | 527 | | |
| 300% modulus (g./d.) | 0.261 | 0.260 | 0.272 | | |

1 Gelled.
2 Unspinnable.

What is claimed is:

1. In a batch process for producing a solution of a substantially linear polyurethane formed by reaction in solution of an isocyanate-terminated prepolymer with a diamine chain extender, the improvement comprising simultaneous, controlled addition of the prepolymer and diamine to the reaction within the limits expressed by the equations:

$$D \leq P + 35\%$$

$$D \geq \frac{100}{95} P$$

in which D represents the amount of diamine and P the amount of prepolymer which have been added at any time, during the period extending from the beginning to the completion of diamine addition, expressed as a mole percent of the respective total amount of each to be added for completion of the reaction.

2. The improvement of claim 1 wherein:

$$D \leq P + 30\%$$

$$D \geq \frac{100}{90} P$$

3. The improvement of claim 1 wherein the diamine extender comprises a lower alkyl diprimary diamine.

4. The improvement of claim 3 wherein said diamine is ethylene diamine.

* * * * *